(12) United States Patent
Shan et al.

(10) Patent No.: US 8,600,541 B2
(45) Date of Patent: Dec. 3, 2013

(54) THREE-DIMENSIONAL WEAVE-FORMING METHOD FOR COMPOSITES

(75) Inventors: Zhongde Shan, Beijing (CN); Feng Liu, Beijing (CN); Xiaoli Dong, Beijing (CN); Zhilin Lin, Beijing (CN)

(73) Assignee: Advanced Manufacture Technology Center, China Academy of Machinery Science & Technology, Beijing (CN)

( * ) Notice: Subject to any disclaimer, the term of this patent is extended or adjusted under 35 U.S.C. 154(b) by 0 days.

(21) Appl. No.: 13/635,415

(22) PCT Filed: Aug. 16, 2010

(86) PCT No.: PCT/CN2010/076019
§ 371 (c)(1),
(2), (4) Date: Oct. 11, 2012

(87) PCT Pub. No.: WO2011/113253
PCT Pub. Date: Sep. 22, 2011

(65) Prior Publication Data
US 2013/0073074 A1    Mar. 21, 2013

(30) Foreign Application Priority Data

Mar. 16, 2010  (CN) .......................... 2010 1 0125066

(51) Int. Cl.
*G06F 19/00*    (2011.01)
(52) U.S. Cl.
USPC ........................................................ 700/131
(58) Field of Classification Search
USPC ............. 700/130, 131, 140, 142–144; 139/11
See application file for complete search history.

(56) References Cited

U.S. PATENT DOCUMENTS

| 4,615,256 | A | * | 10/1986 | Fukuta et al. | 139/11 |
| 4,936,186 | A | * | 6/1990 | Sekido et al. | 87/8 |
| 5,767,023 | A | * | 6/1998 | Berger et al. | 156/148 |
| 6,105,622 | A | * | 8/2000 | Sternheim et al. | 139/11 |
| 7,077,167 | B2 | * | 7/2006 | Nayfeh et al. | 139/11 |

FOREIGN PATENT DOCUMENTS

| CN | 1614114 A | 5/2005 |
| CN | 201151798 Y | 11/2008 |

(Continued)

OTHER PUBLICATIONS

P.R. China, State Intellectual Property Office, International Search Report for International Application No. PCT/CN2010/076019, mailed Dec. 23, 2010.

*Primary Examiner* — Nathan Durham
(74) *Attorney, Agent, or Firm* — Bright IP Law Offices

(57) ABSTRACT

The invention relates to a three-dimensional weave-forming method for composites, comprising the following steps: dividing the CAD model into layers according to the structure of a component, designing by layers and optimizing weaving paths; disposing weaving guiding poles on a controllable digital layout template according to preset rules and intervals; In the direction Z, passing guiding sleeves through the hollow guiding poles and evaginating the guiding sleeves, and then fixing the guiding sleeves onto the controllable digital layout template; selecting filaments to weave; after the weaving of one layer thickness is finished, descending the template in the thickness by one layer to drive the guiding sleeves to expose outside a preset distance to form a new layer of layout template; weaving layer by layer until the whole component is finished; dismounting the component and sewing; and dipping the component in resin and finishing the manufacture of the part. According to the method, the rapid prototyping technology and the weaving technology are organically combined, so that the three-dimensional weaving of components with complex function is realized. Simultaneously, the preparation of composite and the forming of components are integrated, so that the manufacture of functional components with complex structure is realized.

4 Claims, 3 Drawing Sheets

FOREIGN PATENT DOCUMENTS

| | | |
|---|---|---|
| CN | 101586285 A | 11/2009 |
| DE | 19709105 C1 | 8/1998 |
| JP | 1148863 A | 6/1989 |
| KR | 20090132083 A | 12/2009 |

* cited by examiner

THREE-DIMENSIONAL WEAVE-FORMING METHOD FOR COMPOSITES

CROSS REFERENCE TO RELATED APPLICATIONS

This application is the U.S. National Stage of International Patent Application No. PCT/CN2010/076019 filed on Aug. 16, 2010, which claims priority to Chinese Patent Application No. 201010125066.5 filed on Mar. 16, 2010. Both the PCT Application and Chinese Application are hereby incorporated by reference in their entirety.

TECHNICAL FIELD OF THE INVENTION

The invention relates to a three-dimensional weave-forming method for composites, and belongs to the intersection field of textiles and manufacturing.

BACKGROUND OF THE INVENTION

Three-dimensional weaving technology is called one of the most advanced manufacturing technologies for composites worldwide at present. The three-dimensional weaving is a technology to manufacture a three-dimensional seamless whole structure through interweaving long fibers and short fibers, and the process feature of the three-dimensional weaving is that it can manufacture a solid with regular or irregular shape and enable the formation of multifunctional structure, that is, a multi-layer integral structure can be weaved.

In the early 80s, Dr. R. Florentine in Quadrax Advanced Materials Company proposed a four-step processing technology. In 1988 Popper and McConnell in Dupont developed a two-step processing technology, and completed the theoretical system of three-dimensional weaving process. Three-dimensional woven fibers interweave and intercross with each other in a three-dimensional space, and they interweave together not only in a plane but also in the thickness direction, so that a non-layered integral structure is formed, which improves the whole performance of the woven piece. The development of this technology promotes the application of multidirectional reinforced composites in the aviation industry, and attracts enormous attention from research institutions and companies in various countries. However, three-dimensional weaving technology is used mostly in processing preforms with little sectional dimension change, and for preforms with complex shapes, it is necessary to change the arrangement or quantity of fibers during the weaving, which makes the processing procedure complex and the automation control difficult.

Chinese patent No. ZL200820078572.1 discloses a three-dimensional and full five-direction weaving technology and its weaving equipment thereof. In clearances formed by the intersected paths of weaving bundles of a three-dimensional five-direction weaving structure, axial bundles are added along axis direction of weaving, so that the axial performance of the woven materials is improved. However, the specific weaving path mentioned in this method is still along the three-dimensional orthogonal directions and the weaving is executed along row tracks and column tracks, therefore the shapes and the dimensions of the woven preforms are limited, and simultaneously, the woven preforms are lack of high bearing capability and overall performance.

Especially in recent years, with the rapid development of the aerospace industry and the national defense industry or the like in China, requirements on the three-dimensional weaving technology for composites are rapidly increasing. The traditional three-dimensional weaving technology for the preforms has difficulties in processing complex and large structure parts, therefore the research trend in various countries is to continuously improve and develop the weaving process, the adaptability of weaving on the basis of guaranteeing the whole performance of preforms, and promote the application of the three-dimensional weaving technology in fabricating structural parts with complex section, large sectional dimension changes and large dimensions.

SUMMARY OF THE INVENTION

In view of shortcomings and defects in the prior art that the woven parts are in simple shape, small dimension, and low density and has many clearances after dipping, the purpose of the invention is to provide a three-dimensional weave-forming method for composites, aiming at expanding the range of the traditional three-dimensional weaving composites, manufacturing large and complex structural parts, improving the impact resistance and bearing capability of ordinary three-dimensional woven parts, and meeting the structural performance requirements of manufacturing main load-bearing structure with composites.

A three-dimensional weave-forming method for composites comprises the following steps:

a) dividing the CAD model into layers according to the structural performance and the overall dimension feature of a component, and optimizing grid filling paths for each single layer;

b) disposing weaving guiding poles on a controllable digital layout template according to the feature requirement of the component and based on preset rules and intervals;

c) In the direction Z, passing guiding sleeves through the hollow guiding poles and evaginating the guiding sleeves, and then fixing the guiding sleeves on the controllable digital template;

d) selecting, in conjunction with the performance requirement of the component, filaments of the corresponding material as raw material for weaving processing, winding the filaments around the weaving guiding poles to weave the patterns in this layer, and locking the guiding sleeves:

e) descending the controllable digital layout template in the thickness by one layer after the weaving of one layer thickness is finished, driving the guiding sleeves to expose outside a preset distance to form a new layer of layout template in preparation for the weaving of the next layer;

f) weaving layer by layer according to Step e, until the whole component is finished;

g) dismounting the component from the template, and sewing the whole component along the guiding sleeves; and h) dipping the component in resin to finish the manufacture of the composite part.

For the controllable digital layout template, guiding poles can be arrayed in different patterns to form various layout templates according to the structure feature of an component and the preset rules and shapes.

The guiding sleeves are of hollow structures, the outside of which is smooth, and the inside of which is determined by the structure feature of the part to be woven, wherein the inside is a thread shape or zigzag shape; or the guiding sleeves are composed of a plurality of separate filaments.

The selected filament is of composite material which is carbon fiber, metal wire, aramid fiber or polyethylene fiber.

Compared with the prior art, the invention has the following advantages:

1) the rapid prototyping technology and the weaving technology are organically combined, so that the three-dimensional weaving of parts with complex function is realized;

2) the preparation of the composites and the forming of the parts are integrated, so that the manufacture of functional components with complex structure and large scale is realized; and 3) in the present weaving method, a multi-duct dipping passage is available, so that the density of filament in components with complex structure can be further reinforced.

BRIEF DESCRIPTION OF THE DRAWINGS

The specific embodiments of the invention will be described in detail below with reference to the drawings.

Figure 1:
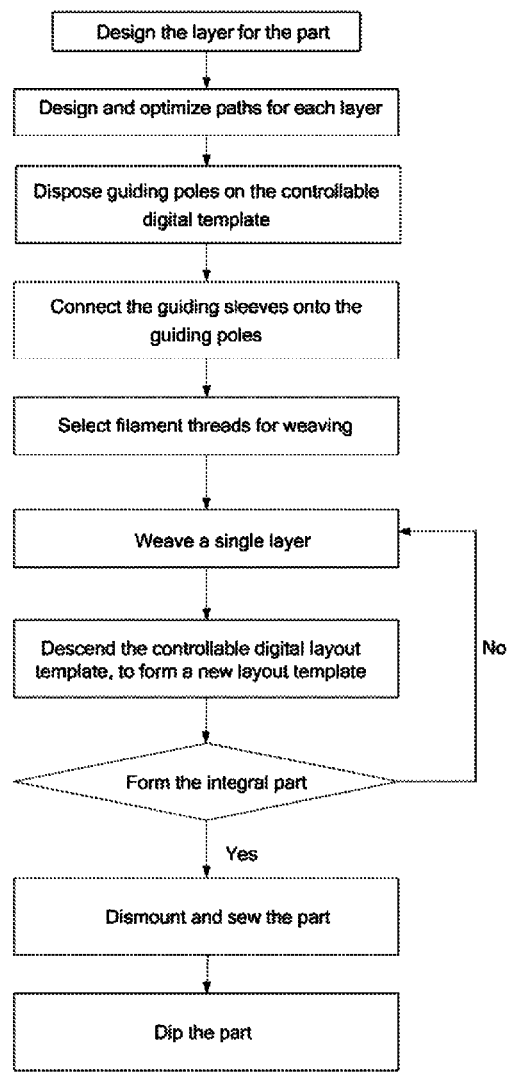
FIG. 1 shows a flow chart of the three-dimensional weaving method for functional parts.
Figure 2:
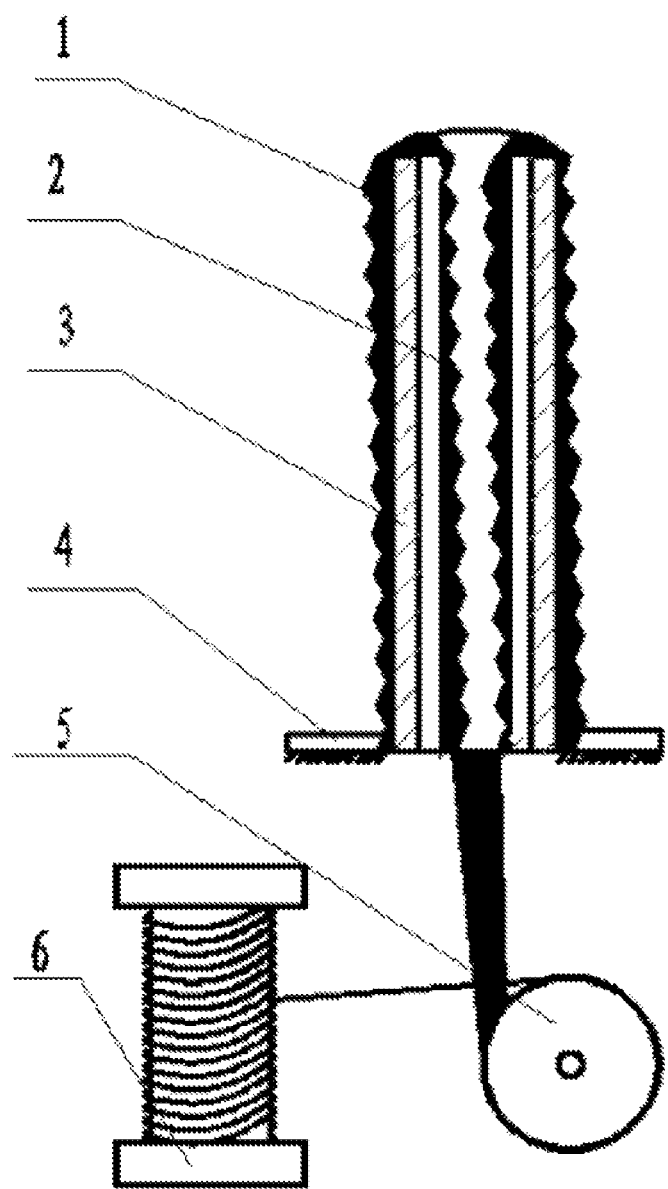
FIG. 2 shows a working process diagram of weaving guiding poles on a controllable digital layout template.

REFERENCE NUMBERS 1. outer layer of the guiding sleeve; 2. inner layer of the guiding sleeve; 3. guiding pole; 4. fixing device; 5. tensioning device; 6. spool.

DETAILED DESCRIPTION OF THE INVENTION

To clearly explain features of steps of the three-dimensional weave-forming method for composites according to the present invention, a method for weaving a simple hexagonal prism with a regular hexagonal cross section will be described below as example.

According to the feature of the component, the weaving guiding poles 3 are densely arrayed on a template with an interval of 3 mm, to form a controllable digital layout template of 60 mm×60 mm, According to the performance requirement of the component, a plurality of hollow guiding sleeves, the outside of which is smooth and the inside of which is in a thread shape, are woven. The guiding sleeves pass through the hollow guiding poles 3 in the direction Z and are evaginated, and then the guiding sleeves are fixed on the controllable digital template, wherein the inner layer of the guiding sleeves 2 is stuck to the inner wall of the hollow guiding pole 3 tightly, and the outer layer of the guiding sleeve 1 with threads wraps the outer wall of the hollow guiding pole 3. The guiding sleeve sleeved at the bottom of the outer wall of the guiding pole 3 is fixed by the fixing device 4. The guiding sleeve on the inner side of the guiding pole 3 is locked by the tensioning device 5 and is capable of slowly moving together with the guiding pole 3, so that the guiding sleeves are continuously fed from the spool 6.

Figure 3:
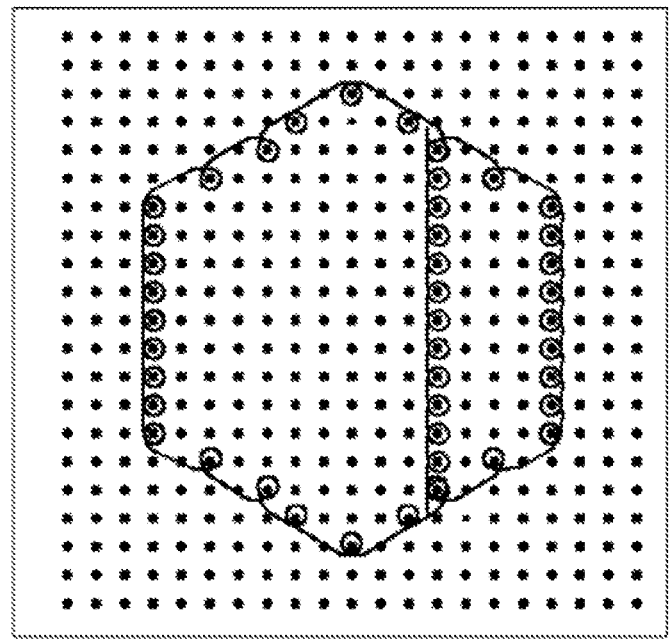
FIG. 3 shows a winding way in the direction X when the layered cross section is a regular hexagon.
Figure 4:
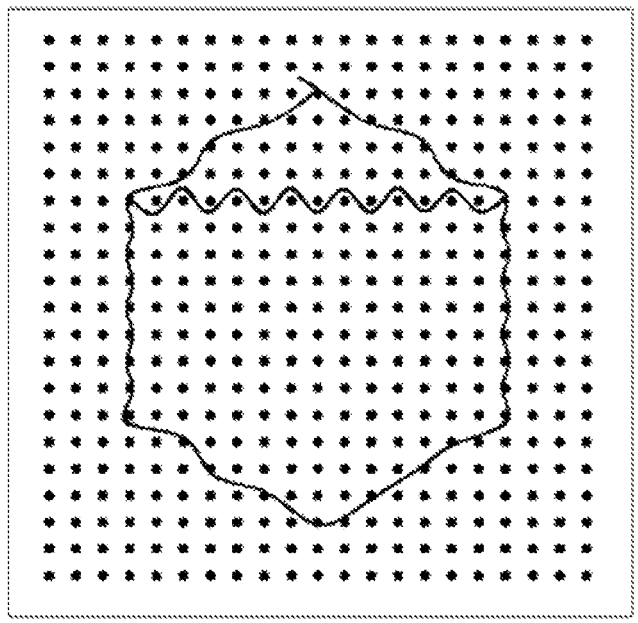
FIG. 4 shows a winding way in the direction Y when the layered cross section is a regular hexagon.

Carbon fiber is selected as filaments for weaving and wound around the guiding poles 3 according to the weaving paths as shown in FIG. 3, and the guiding sleeves are locked to finish the weaving of the patterns. Glass fiber is selected as filaments for weaving and wound around the guiding poles 3 according to the weaving paths as shown in FIG. 4, and the guiding sleeves are locked to finish the weaving of the patterns. When above weaving is finished, the controllable digital layout template is descended in thickness by one layer to drive the guiding sleeve to expose outside a certain distance to form a new layer of layout template in preparation for the weaving of the next layer.

The filament threads are continuously wound by repeating the above steps until the weaving of the whole component is finished. Finally, the component is dismounted, integrally sewn along the guiding sleeves and dipped in resin, to form the desired composite functional part.

In the embodiment, although the three-dimensional weaving method is described merely with the weaving in two perpendicular directions and in the regular hexagon as example, during practical weaving of parts, the weaving directions may have several angles and may be not limited to the directions shown in the drawings. Simultaneously, the weaving paths in the embodiment are not limited to the above two paths, and various movement modes in a two-dimensional plane are possible.

Above contents only describe the preferred embodiment of the present invention. It should be noted that, for one skilled in the art, the present invention may have various modifications, embellishments or changes within the principle of the invention, and these modifications, embellishments or changes should be included within the protection scope of the present invention.

What is claimed is:

1. A three-dimensional weave-forming method for composites, comprising:
   a) dividing CAD model into layers according to structural performance and overall dimension features of a component, and optimizing grid filling paths for each single layer;
   b) disposing weaving guiding poles on a controllable digital layout template according to feature requirement of the component and based on preset rules and intervals;
   c) in direction Z, passing guiding sleeves through hollow guiding poles and evaginating guiding sleeves, and then fixing the guiding sleeves on the controllable digital layout template;
   d) selecting, in conjunction with performance requirement of the component, filaments of corresponding material as raw material for weaving processing, winding the filaments around the weaving guiding poles to weave patterns in this layer, and locking the guiding sleeves;
   e) descending the controllable digital layout template in thickness by one layer after weaving of one layer thickness is finished, driving the guiding sleeves to expose outside a preset distance, to form a new layer of layout template in preparation for weaving of the next layer;
   f) weaving layer by layer according to Step e), until the whole component is finished;
   g) dismounting the component from the controllable digital layout template, and sewing the whole component along the guiding sleeves; and
   h) dipping the component in resin to finish manufacture of composite part.

2. The three-dimensional weave-forming method for composites according to claim 1, wherein for the controllable digital layout template, guiding poles can be arrayed in different patterns to form various layout templates according to structure feature of the component and the preset rules and shapes.

3. The three-dimensional weave-forming method for composites according to claim 1, wherein the guiding sleeves are of hollow structures, an outside of which is smooth, and inside shape of which is determined by the structure feature of part to be woven, wherein the inside shape is a thread shape or zigzag shape; or the guiding sleeves are composed of a plurality of separate filaments.

4. The three-dimensional weave-forming method for composites according to claim 1, wherein the selected filament is of composite which is carbon fiber, metal wire, aramid fiber or polyethylene fiber.

* * * * *